US009588740B1

(12) United States Patent
Tyree et al.

(10) Patent No.: US 9,588,740 B1

(45) Date of Patent: Mar. 7, 2017

(54) SYSTEMS, METHODS AND COMPUTER PROGRAM PRODUCTS FOR CONSTRUCTION OF CLOUD APPLICATIONS

(71) Applicant: CA, Inc., Islandia, NY (US)

(72) Inventors: David S. Tyree, Denver, CO (US); Nathan J. Giardina, San Diego, CA (US); Beau Croteau, Bay Shore, NY (US); Robert Hucik, Simi Valley, CA (US)

(73) Assignee: CA, Inc., New York, NY (US)

( * ) Notice: Subject to any disclaimer, the term of this patent is extended or adjusted under 35 U.S.C. 154(b) by 265 days.

(21) Appl. No.: 13/791,974

(22) Filed: Mar. 9, 2013

(51) Int. Cl.

| | |
|---|---|
| ***G06F 9/44*** | (2006.01) |
| ***G06F 9/445*** | (2006.01) |
| *G06F 9/45* | (2006.01) |

(52) U.S. Cl.

CPC ................ *G06F 8/31* (2013.01); *G06F 8/311* (2013.01); *G06F 9/44505* (2013.01); *G06F 8/10* (2013.01); *G06F 8/42* (2013.01)

(58) Field of Classification Search

CPC ..... G06F 8/10; G06F 8/20; G06F 8/36; G06F 8/61; G06F 9/45537; G06F 9/5072; G06F 11/1438; G06F 9/44505; H04L 12/2602

USPC .............................................................. 718/1

See application file for complete search history.

(56) References Cited

U.S. PATENT DOCUMENTS

| | | | | |
|---|---|---|---|---|
| 9,003,406 | B1 * | 4/2015 | Hodge ...................... | G06F 8/60 717/176 |
| 2004/0158575 | A1 * | 8/2004 | Jacquemot .......... | H04L 12/2602 |
| 2007/0294312 | A1 * | 12/2007 | Seshadri et al. .............. | 707/200 |
| 2008/0010631 | A1 * | 1/2008 | Harvey et al. ................ | 717/131 |
| 2009/0276771 | A1 * | 11/2009 | Nickolov et al. ............. | 717/177 |
| 2010/0131649 | A1 * | 5/2010 | Ferris ............................ | 709/226 |
| 2011/0185339 | A1 * | 7/2011 | Andrade et al. .............. | 717/104 |
| 2011/0191788 | A1 * | 8/2011 | Jacobson ............ | G06F 9/45537 719/328 |
| 2011/0276951 | A1 * | 11/2011 | Jain .............................. | 717/140 |
| 2011/0321033 | A1 * | 12/2011 | Kelkar ................ | G06F 9/44505 717/174 |
| 2012/0042305 | A1 * | 2/2012 | Sedukhin .................. | G06F 8/10 717/139 |
| 2012/0159517 | A1 * | 6/2012 | Shen et al. .................... | 719/318 |
| 2012/0222003 | A1 * | 8/2012 | Shukla et al. ................ | 717/115 |
| 2012/0240135 | A1 * | 9/2012 | Risbood et al. .............. | 719/328 |
| 2012/0266168 | A1 * | 10/2012 | Spivak et al. .................... | 718/1 |

(Continued)

*Primary Examiner* — Lewis A Bullock, Jr.

*Assistant Examiner* — Gilles Kepnang

(74) *Attorney, Agent, or Firm* — Myers Bigel, P.A.

(57) ABSTRACT

An application term of a declarative programming language is provided for creating an application to be executed on a node in a cloud network. The application term is independent of an application configuration for the application prior to compilation of the application term and the application configuration is associated with the application at execution time. A resource term for preparing a resource for the application is provided independent of the application configuration prior to compilation and the application configuration prepares the resource of a selected node for the application at execution time. An action term for performing an action and a task term for performing a task of the action are provided independent of the application configuration prior to compilation. The terms are compiled and executed to build the application in the cloud network.

19 Claims, 8 Drawing Sheets

(56) References Cited

U.S. PATENT DOCUMENTS

| | | | | |
|---|---|---|---|---|
| 2012/0317564 | A1* | 12/2012 | Lee | 717/175 |
| 2013/0124807 | A1* | 5/2013 | Nielsen | G06F 11/1438<br>711/162 |
| 2013/0198719 | A1* | 8/2013 | Raman | G06F 8/61<br>717/121 |
| 2013/0232497 | A1* | 9/2013 | Jalagam | G06F 9/5072<br>718/104 |
| 2013/0232498 | A1* | 9/2013 | Mangtani | G06F 9/5072<br>718/104 |
| 2013/0246996 | A1* | 9/2013 | Duggal | G06F 8/35<br>717/104 |
| 2013/0254757 | A1* | 9/2013 | Yousouf et al. | 717/174 |
| 2013/0263080 | A1* | 10/2013 | Karnik | G06F 8/61<br>717/104 |
| 2014/0040656 | A1* | 2/2014 | Ho et al. | 714/3 |

* cited by examiner

700

702

```
app.resources(function(app, appData){
        app.request({ type:'tomcat', name:'Hudson', logs:[]});
});
app.on("install", function(app, appData){
        app.allocateResources();
        var resource={"type":"tomcat","name":"Hudson","logs":[]};
        app.addVirtualHost(resource, "hudson","/");
        app.pushToNodesWith(resource, 'hudson.war', '/');
        app.shellOnNodesWith(resource,function(appData,shell){
                require('shelljs/global');
                exec( 'tomcat/bin/startup.sh');
        });
});
```

```
app.configOnNodesWith("tomcat",function(appData){
        ConfigFile.edit("tomcat/conf/server.xml",function(file){
        file.lineWith(/<Connector port="8080"/, function(line){
                line.replace("8080", appData.resources.tomcat_jira.ports["http port"].port);
        });
        file.lineWith(/<Connector port="8009" protocol="AJPV1.3" redirectPort="8443" URIEncoding="UTF-
8" \/>/, function(line){
                line.replace("8009", appData.resources.tomcat_jira.ports.ajp_port.port);
        });
        file.lineWith(/<Server port="8005" shutdown="SHUTDOWN">/, function(line){
                line.replace("8005", appData.resources.tomcat_jira.ports["control port"].port);
        });
        file.lineWith(/<Context path="" docBase="\${catalina.home}\/atlassian-jira"/,function(line){
                line.append('\n<Parameter name="jira.home" value="/home/'+appData.appKey+'/jira"/>');
        });
        });
        ConfigFile.touch("jira/dbconfig.xml",
                        '<?xml version="1.0" encoding="UTF-8"?>'+
                        '<jira-database-config>'+
                        '<name>defaultDS</name>'+
                        '<delegator-name>default</delegator-name>'+
                        '<database-type>mysql</database-type>'+
                        '<schema-name></schema-name>'+
                        '<jdbc-datasource>'+
                        '<url>jdbc:mysql://'+appData.appKey+'_mysql_jira:3306/'+appData.appKey+'_jira?
useUnicode=true&characterEncoding=utf8&sessionVariables=storage_engine=InnoDB</url>'+
                        '<driver-class>com.mysql.jdbc.Driver</driver-class>'+
                        '<username>'+appData.appKey+'</username>'+
                        '<password></password>'+
                        '<pool-size>15</pool-size>'+
                        '<validation-query>select 1</validation-query>'+
                        '</jdbc-datasource>'+
                        '</jira-database-config>'
                );
        ConfigFile.edit("tomcat/conf/catalina.properties",function(file){
                file.setProperty("common.loader",function(prop){
                        prop.append(",${catalina.base}/lib/ext/*.jar");
                });
        });
        ConfigFile.edit("tomcat/bin/startup.sh",function(file){
                file.lineWith(/\!\/bin\/sh/,function(line){
                        line.append('\nexport JAVA_OPTS="$JAVA_OPTS -Xms512m -Xmx1224m -
XX:MaxPermSize=256m"\n');
                        line.append("\nexport PATH=/home/"+appData.appKey+"/jre1.6.0_32/bin:$PATH\
n");
        });
});
```

*FIGURE 8*

SYSTEMS, METHODS AND COMPUTER PROGRAM PRODUCTS FOR CONSTRUCTION OF CLOUD APPLICATIONS

TECHNICAL FIELD

The present disclosure relates generally to computer networks, software applications and cloud computing networks.

BACKGROUND

Cloud computing allows applications to be executed on various computers or nodes of a computing network. Computer programmers write programs to build applications for nodes in a cloud network. Existing cloud platforms focus on machines and servers. Building an application for a cloud network requires a specific application configuration for a node, including the location and resources of the node. Application creation in this environment is not easily separated from the configuration and maintenance details. Having to program for specific application configurations adds an extra layer of complexity for the user and limits the ability to install and execute applications in a dynamic cloud environment.

BRIEF SUMMARY

According to an embodiment of the disclosure, an application term of a declarative programming language is obtained for building an application to be executed on a node in a node network. The node network may be a cloud network of on-premise and/or remote nodes. The application term is independent of an application configuration for the application prior to compilation of the application term and the application configuration is associated with the application at execution time of the application term. A resource term of the declarative programming language is obtained for preparing a resource for the application. The resource term is independent of the application configuration prior to compilation of the resource term and the application configuration prepares the resource of a selected node of the node network for the application at execution time of the resource term. An action term of the declarative programming language is obtained for performing an action of the application. The action term is independent of the application configuration prior to compilation of the action term. A task term of the declarative programming language is obtained for performing a task of the action, wherein the task term is independent of the application configuration prior to compilation of the task term.

The application term, the resource term, the action term and the task term may be provided to a user for programming an application on a computing device. The application term, the resource term, the action term and the task term may be received in a memory of a computing device. The terms may be compiled as syntax keywords of the declarative programming language. The terms may be executed to carry out instructions to build the application.

According to an embodiment, the application configuration is associated with the application at the execution time of the application term based on the selected node.

In a further embodiment, the resource for the application is prepared on the selected node at the execution time of the resource term based on the application configuration. The resource may be allocated to the selected node.

According to another embodiment, a unique application variable is generated for the application at the execution time of the application term, wherein the unique application variable introduces application specific values into the application configuration of the respective application on the selected node at the execution time of the application term.

Also, a second unique application variable may be generated for a second application on the selected node of a same type as the application and wherein the application and the second application may be executed on the selected node simultaneously.

Some other embodiments are directed to related methods, systems and computer program products.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Embodiments of the present disclosure are illustrated by way of example and are not limited by the accompanying figures with like references indicating like elements.

FIG. 7 illustrates example code of an application programming language for a cloud network, according to various embodiments described herein;

FIG. 8 illustrates example code of an application programming language for a cloud network, according to various embodiments described herein;

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

The terminology used herein is for the purpose of describing particular embodiments only and is not intended to be limiting to other embodiments. As used herein, the singular forms “a”, “an” and “the” are intended to include the plural forms as well, unless the context clearly indicates otherwise. It will be further understood that the terms “comprises,” “comprising,” “includes” and/or “including” when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combined software and hardware implementation that may all generally be referred to herein as a “circuit,” “module,” “component,” or “system.” Furthermore, aspects of the present disclosure may take the form of a computer program product embodied in one or more computer readable media having computer readable program code embodied thereon.

Figure 1:
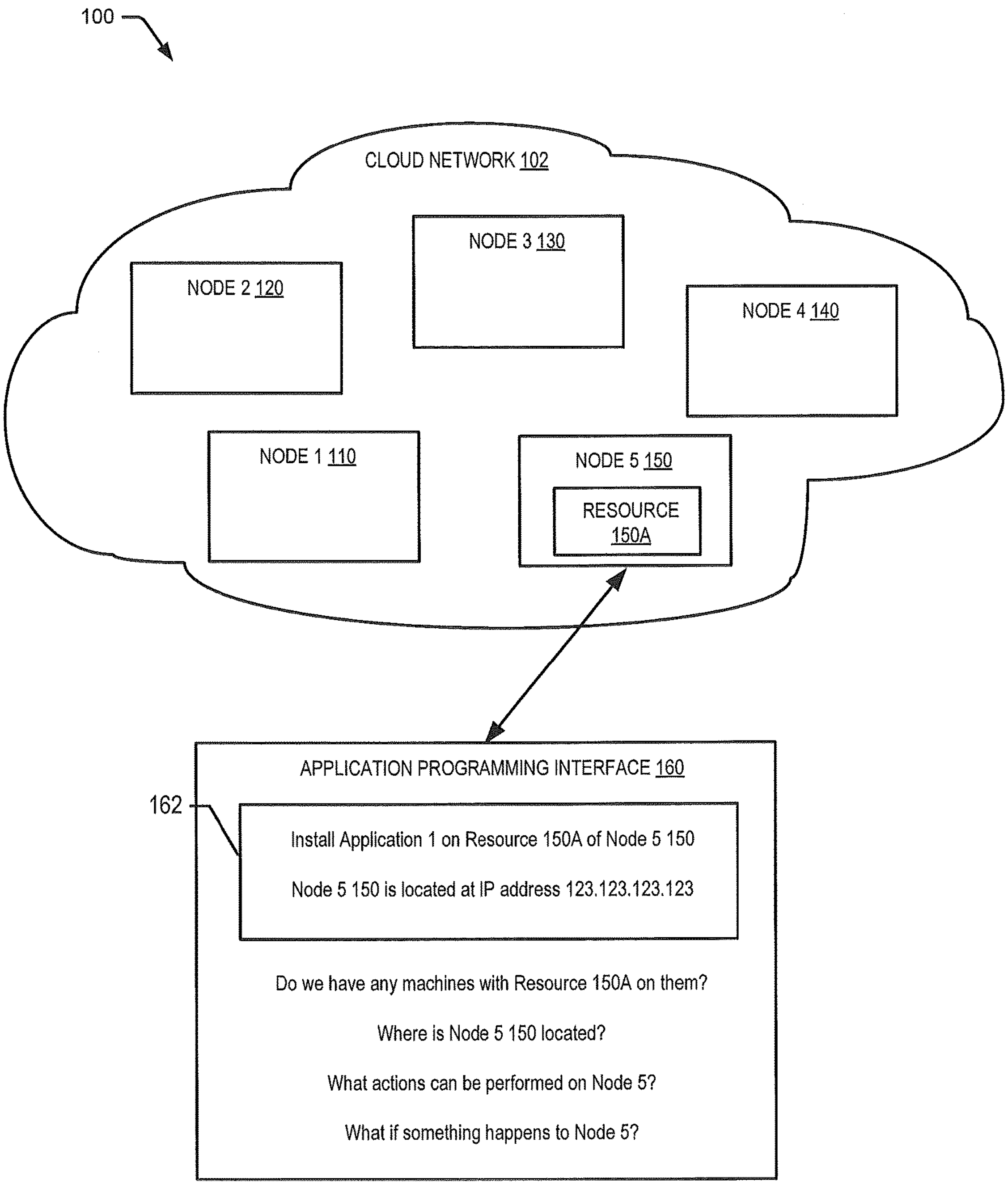
FIG. 1 illustrates an existing system for building an application for a cloud network.

Existing cloud platforms focus on machines and require an application configuration to be specified ahead of time before installation or execution of the application on a specified node. FIG. 1 shows system 100 with a cloud network 102 of nodes 1 to 5 (110-150). A typical application programming interface 160 is concerned with identifying the specific node to be utilized by an application. A user has to ask whether there is a machine with Resource 150A. Window 162 is focused on specifying, up front in the build programming language, application configuration information such as where the node is located and how the application will be configured with the resources of the node.

Application configurations usually involve preparing or allocating resources and configuring the application to use the resources. An application configuration may involve setting its name, creating a user, uploading a database, or other affirmative steps to prepare a specified node and its resources for an application. A typical installation may require downloading an application package, locating systems (database and web server) to install the package on, installing a database and web server software, installing the application package, configuring the application package and testing the installation. This adds complexity and additional hurdles for an application user or system administrator. A user may have an application the user wishes to create and would prefer a high-level, straightforward way to build the application and have it executed within a large and dynamic network of resources.

Various embodiments described herein provide a programming language for building, deploying, scaling, maintaining, and/or testing applications based in a cloud network, whether on-premise host computers and/or remote host computers. Applications may be written and built to be configured with resources in real time as a result of executing the programming language. At execution, application requirements and configuration steps may take advantage of information acquired from earlier configuration steps to make application configuration decisions. Examples of applications that may be built, configured, tested and executed include managed hosting applications such as Rackspace® applications, application services such as Amazon Web Services (AWS)® applications, portable development environments such as Vagrant® applications, debugging application such as Bugnet® applications, issue tracking application such as JIRA® applications, version control repositories such as Gitlab® applications, etc. In some regards, the programming language may be considered a Domain Specific Language (DSL) or a language created for a specific purpose.

Various embodiments described herein may be used for constructing cloud applications in a way that is technology agnostic. Technology is generally the foundation on which applications are built, but with various embodiments described herein, a user need not ask questions such as “Do I have a virtual machine with a MySQL® database on it?” or “Do I have one with Ruby on it?” Embodiments of the described declarative programming language can take care of these issues and cause a computer system or application manager to make relevant decisions for the programmer and/or user.

Embodiments of the described declarative programming language allow a programmer and/or user to:

Create an Application;

Allocate Resources for that Application;

Perform Actions on that Resource;

Define Tasks to perform during those Actions;

Edit text and configuration files;

Do routine command line maintenance;

Parameterize portions of the application for re-usability;

Test aspects of the overall application to ensure success and reachability; and

Utilize dynamic configuration data when needed.

There are many features of the language described in the embodiments. From the viewpoint of the programmer, the language is server agnostic. The language may isolate the building of applications from understanding specific machines. It does not require that the programmer understand where resources, servers or virtual machines are currently allocated in order to define actions around all aspects of an application’s life cycle.

Rather than specifying machines, a programmer can specify resources that will be used with the application. In many cases, the resources are necessary for an application. Resources can include, among others, a database (e.g., MySQL® database, MSSQL® database, PostreSQL® database), an application server (e.g., J2EE® server, Tomcat® server, NodeJS® server, Ruby on Rails® server) and/or other supporting infrastructure or services such as a message queue or a transaction server. The language, when executed, will utilize or allocate resources as necessary, depending on nodes that are available at the time of execution. This generates configuration information about those resources.

The programming language may use application configuration information that is stored or captured in a separate process to drive application configuration. For example, a virtual host may be allocated, setting up DNS and an HTTP proxy so the application can be reached by the world. Network ports can be allocated. A port can be reserved and saved in the application configuration file. Application configuration files can be modified using information from previous steps. Files can be copied to various resources. Shell code can be executed, often with application configuration information.

Some configuration information may be abstracted from installation information. If the application or same type of application is installed elsewhere, those instructions as to how to set up the same application package can be accessed at execution time and used for configuration.

Figure 2:
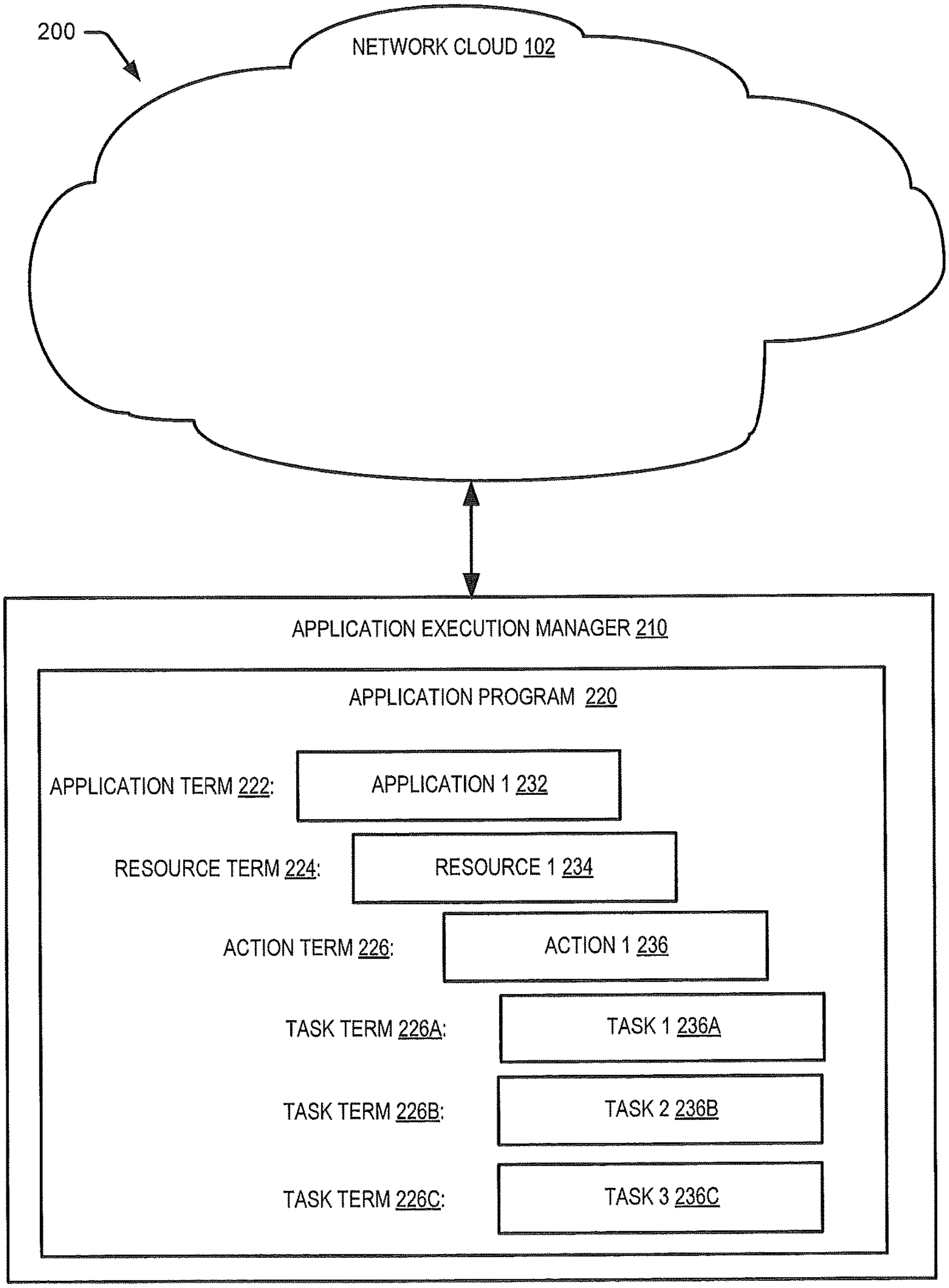
FIG. 2 illustrates a conceptual view of a system for providing an application programming language for a cloud network, according to various embodiments described herein.

FIG. 2 illustrates an exemplary system 200 of a computing environment involving cloud network 102. Cloud network 102 facilitates wireless or wired communication between computing devices, and may communicate using, for example, IP packets, Frame Relay frames, Asynchronous Transfer Mode (ATM) cells, voice, video, data, and other suitable information between network addresses. Cloud network 102 may include one or more local area networks (LANs), radio access networks (RANs), metropolitan area networks (MANS), wide area networks (WANs), virtual private networks (VPNs), a portion of the global computer network known as the Internet, and/or any other communication system or systems at one or more locations. In FIG. 1, cloud network 102 shows nodes 1-5 (110-150), but according to the programmer, it is just cloud network 102 in system 200 of FIG. 2.

According to the embodiment in FIG. 2, users and/or administrators may use application execution manager 210 to build, test, compile, install, execute and/or otherwise handle applications. Application 1 232 may be built for installation or execution on nodes of cloud network 102 with application program 220. No application configuration is required to be specified in application program 220 prior to compilation and execution. Application execution manager 210 will associate an application configuration with Application 1 232 based on a selection from nodes 110-150 when application program 220 is executed. A node may be selected at or near the time of execution. According to some embodiments, installation details may be used to develop application configurations.

Each node may have certain resources prepared for the application. In some cases, resources may be allocated to selected nodes. These resources may also be specified in application program 220.

Application program 220 illustrates Application Term 222, which represents a language component used to build high level application object Application 1 232. Application 1 232 represents the application and the lifecycle of the application. One or more resources needed by the application, such as Resource 1 234, may be prepared for Application 1 232 using Resource Term 224. A resource may be a database and/or some software stack that provides functionality required by the application. At this time, no application configuration specific to a node is necessary. This can be advantageous as the nodes in a network or cloud and their configurations may change between now and the time of execution.

Next, actions can be defined for different lifecycle events, such as install, backup and/or restore. Action Term 226 may be used for creating Action 1 236. Within each action, various tasks can be defined, such as allocating a port, copying a file from the package file, executing a shell command, editing a file, etc. Task Terms 226A-C may be used to define Tasks 236A-C.

Figure 3:
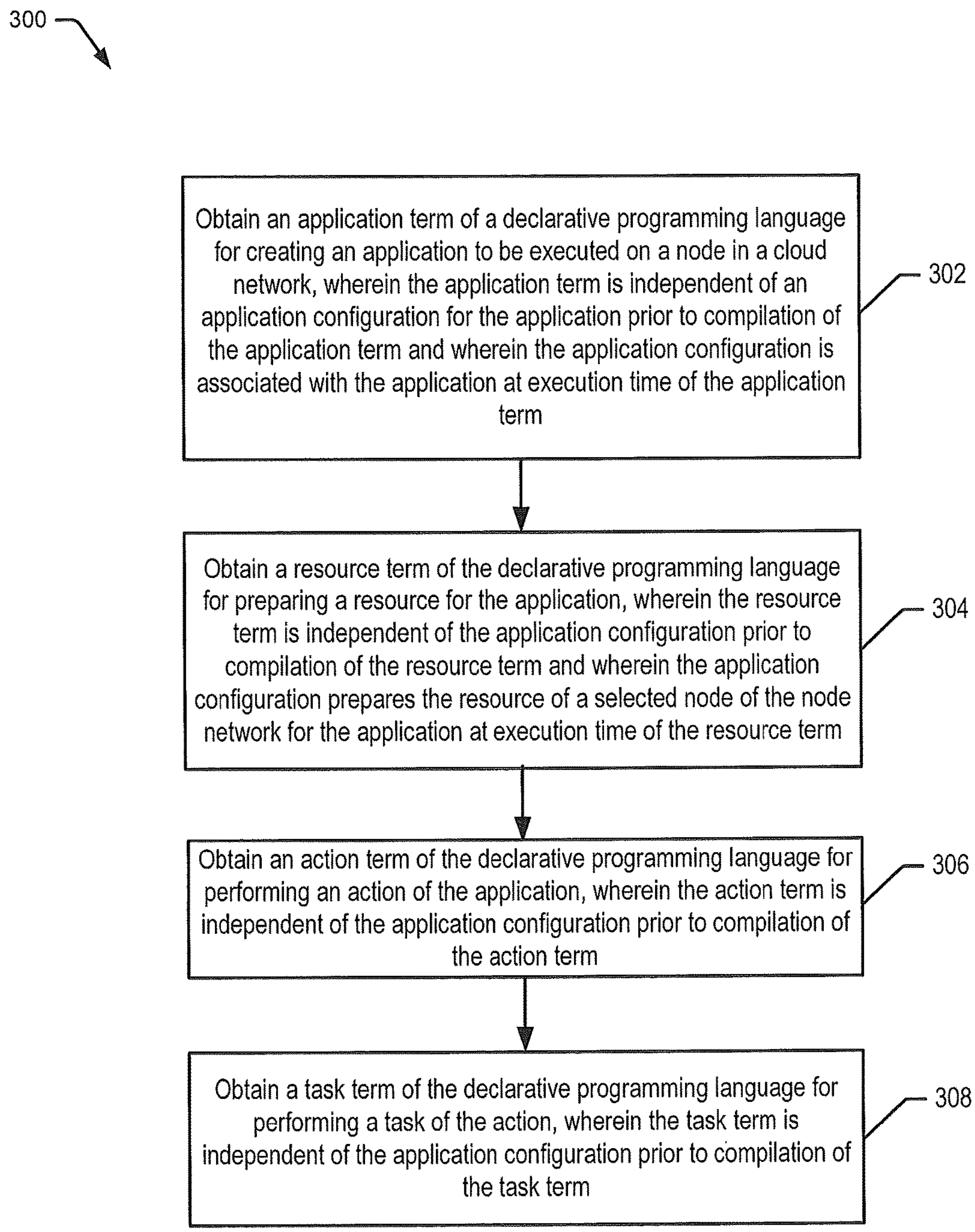
FIG. 3 illustrates a process for providing an application programming language for a cloud network, according to various embodiments described herein.

FIG. 3 shows a flowchart 300 for obtaining the application programming language from terms provided to a user, according to an embodiment. In block 302, an application term of a declarative programming language is obtained for building an application to be executed on a node in a node network. The node network may be a cloud network with computers that are on-premise and/or remote. The application term is independent of an application configuration for the application prior to compilation of the application term. That is, the programming language does not require an application configuration for the application. The language can be written and/or compiled without completing the application configuration for the application. The application configuration is associated with the application at execution time of the application term. Certain pieces of configuration information can be entered into the application configuration during execution of the program written by the programming language.

In block 304, a resource term of the declarative programming language is obtained for preparing a resource for the application. The resource term is independent of the application configuration prior to compilation of the resource term and the application configuration prepares the resource of a selected node of the node network for the application at execution time of the resource term. Resource preparation may involve allocating the resource to one or more nodes of the network.

In block 306, an action term of the declarative programming language is obtained for performing an action of the application. The action term is independent of the application configuration prior to compilation of the action term. Actions may be written before knowing the information from the application configuration.

In block 308, a task term of the declarative programming language is obtained for performing a task of the action, wherein the task term is independent of the application configuration prior to compilation of the task term. In some cases, any combination and/or subcombination of terms may be used.

Figure 4:
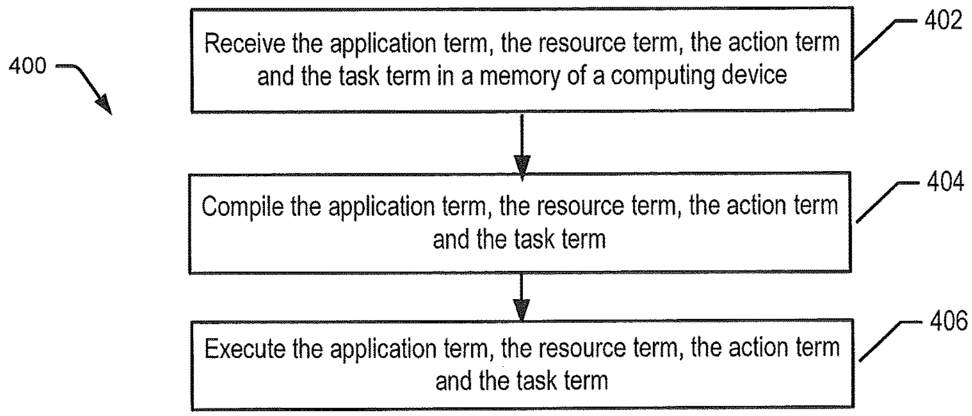
FIG. 4 illustrates another process for providing an application programming language for a cloud network, according to various embodiments described herein.

FIG. 4 shows a flowchart 400 for the application programming language, according to an embodiment. In block 402, the application, resource, action and task terms are received in memory in a computing device. In block 404, the programming language code, with its terms and any corresponding values, may be compiled. Compilation may involve gathering terms and values into a program. Compilation may also include generating code, such as a JavaScript program. In some cases, compilation may also include generating lower level code for execution.

In block 406, the terms are executed. Execution may involve carrying out instructions according to compiled terms to build, install, carry out, update, modify and/or remove the application. Other application lifecycle operations not listed here may be performed for the application. The application configuration is associated with the application and the application is built on one or more nodes to be ready for use.

Figure 5:
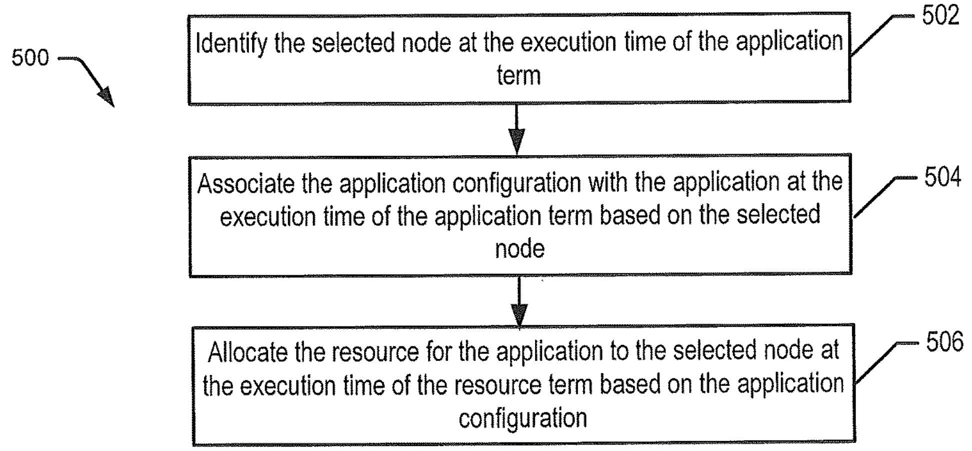
FIG. 5 illustrates another process for providing an application programming language for a cloud network, according to various embodiments described herein.

FIG. 5 shows a process 500 that takes place at the time of execution, according to an embodiment. The application term is executed. In block 502, a selected node is identified at the time of execution. In block 504, an application configuration is associated with the application at execution time. The application configuration configures the application for use on the selected node. This application configuration was not specified in the programming language of the user. The application configuration is developed based on the selected node. This may involve details about the location of the node and resources on the node or resources to be allocated on the node.

In block 506, resources for the application are prepared for the application at the time the resource term is executed. In many embodiments, resources are allocated to the selected node or nodes. Resources may be identified, configured and/or allocated as part of the application configuration. As the language proceeds step by step, the application configuration may build upon previous configuration steps. In some cases, values in later steps are replaced or filled with values from previous or earlier steps.

Figure 9:
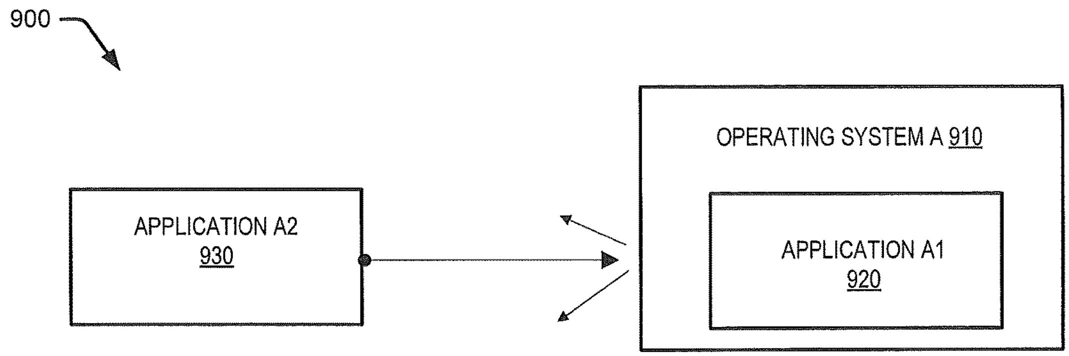
FIG. 9 illustrates a conceptual view of an existing operating system for applications on a node of a cloud network.

Often, existing applications are hard-coded to a specific setup. As shown in typical system 900 of FIG. 9, while the Operating System A 910 allows Application A1 930, it did not allow a user to run Application A2 930 on server Operating System A 910 because there is no knowledge of how to separate out shared variables/files.

A solution is to use dynamic application variables generated on a per-application basis. In an embodiment, an application key or appKey [A-Za-z0-9] is generated for each application. The application keys may be randomly generated. Application keys may be used to uniquely identify applications and instances of applications. Application keys isolate or shield applications from other applications. The application key described here allows you to introduce application specific values into your application configuration and as a result allows you to make generic what would otherwise be a static variable.

Figure 6:
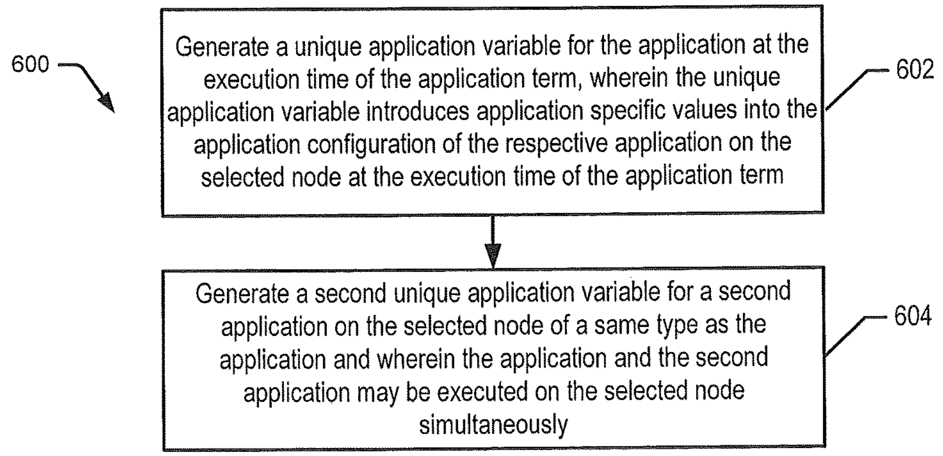
FIG. 6 illustrates another process for providing an application programming language for a cloud network, according to various embodiments described herein.

For example, FIG. 6 shows a process 600 that addresses this problem. In block 602, a unique application variable is generated for the application at the execution time of the application term. The unique application variable introduces application specific values into the application configuration of the respective application on the selected node at the execution time of the application term. Application specific values can include the use of a resource name specified in the application installation step, the application key that was generated and the resource type based on the type of resource requested. An installation directory for the application may use the application key in naming. The user associated with the installation may also be named by the application key.

In block 604, a second unique application variable is generated for a second application on the selected node of a same type as the application and wherein the application and the second application may be executed on the selected node simultaneously.

In an embodiment, a database is created and named, perhaps with the application key (e.g., application key—specified database name—database type). This is a first piece of configuration information. This database would be allocated on a particular node. Application execution manager 210 may provide its own domain name service (DNS) infrastructure which will allow any application to ask for the IP address behind a named resource. When a DNS query is made for the named database, application execution manager 210 may respond with the IP address of the database server that the database is installed upon. This information may be stored in an application configuration record, which is a structure containing all configuration information that is known for a particular application.

Once the database is allocated, the application obtains instructions for how to use the database. The application configuration file is modified. In some cases, the application configuration file associated with the application is opened, a database connection string is searched and replaced with the database name (and port).

The language provides a template for the application execution manager 210 to follow to install an application. As the language is executed, various operations take place to generate configuration information, which is then used to fill in data required for other operations in the execution of the application. Such as in the example above, until the database is allocated, the name of the database and how to communicate with it are missing. Allocating the database will produce sufficient information for the application configuration to configure the application for the database.

Embodiments of the described language are designed with re-usability and cleaner programming language statements in mind. In some embodiments, the language was designed from the ground up to provide command-line and web-based requests in almost the same syntax or manner. An example of the language is shown in example code 700 in FIG. 7.

In the example code 700, an application term 702 may be represented by the keyword “app”, which creates the application object. No details of an application configuration need to be specified by the programmer. The language will create the configuration object (“appData” object in the example code) to contain the future application specific configuration data. Such configuration data may not be developed until execution time.

The application may need a resource prepared for an application of its type. A resource keyword such as resource term 704 may be used to prepare resources for use by an application. For example, “allocateResources” may be used with “pushToNodesWith” to prepare whatever nodes are capable or selected to utilize a specified resource. In a further embodiment, sample language 700 also allows execution on remote nodes using the resources selected so that applications can be executed in different execution contexts.

FIG. 8 shows another portion 800 of the programming language, according to an embodiment. The language as written in portion 800 is independent of an application configuration. In this example, language keyword term 802 “appData” is used to maintain application configuration data, but prior to compilation, there is no application configuration information to associate with the application. As nodes are selected and resources are allocated at execution time, application configuration information is developed in appData. The “line.replace” keyword term 806 replaces placeholder values with application configuration information, which appData helps to collect and maintain. When the application object is populated with the node, resource and configuration information obtained at execution time, the application configuration is associated with the application.

Figure 10:
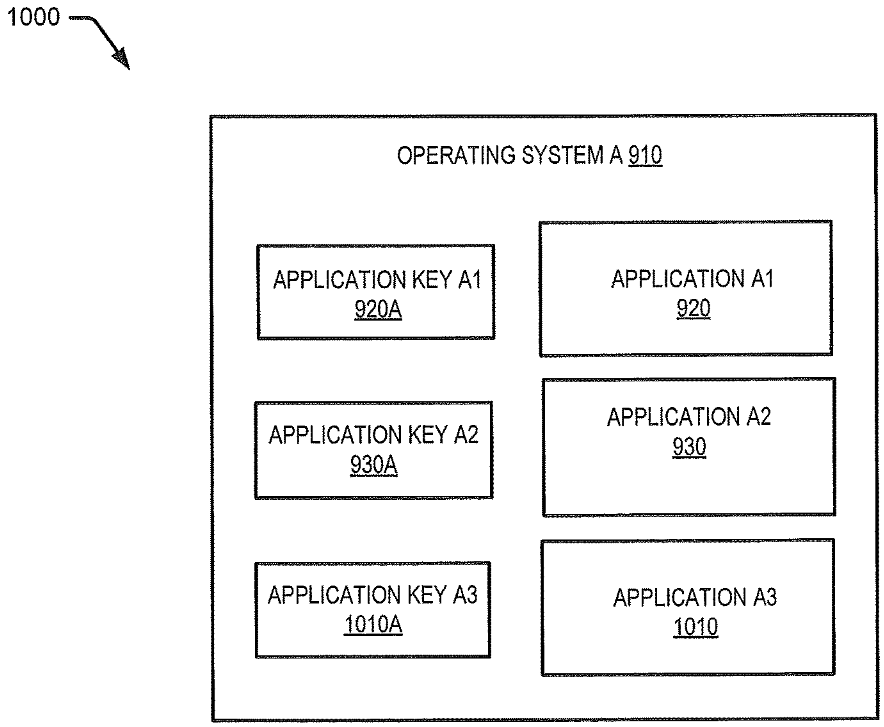
FIG. 10 illustrates a conceptual view of multiple instances of an application on a node of a cloud network, according to various embodiments described herein.

Keyword term 804 or “appKey” represents an application key to be generated for this application so that it is isolated from other applications of the same type. This provides for multi-tenant configurations. For example, FIG. 10 shows system 1000 with operating system A 910 with Application A1 920, Application A2 930 and Application A3 1010. These applications may be the same type but are allowed to coexist on operating system A 910. Application Key A1 920A, Application Key A2 930A and Application Key A3 1010A are unique identifiers that isolate each application from each other.

In an embodiment, application terms for application program 220 may be provided through a browser on a node or computing device. The browser may be any commonly used browser, including any multithreading browser.

As will be appreciated by one skilled in the art, aspects of the disclosure may be embodied as a method, data processing system, and/or computer program product. Furthermore, embodiments may take the form of a computer program product on a tangible computer readable storage medium having computer program code embodied in the medium that can be executed by a computing device.

Figure 11:
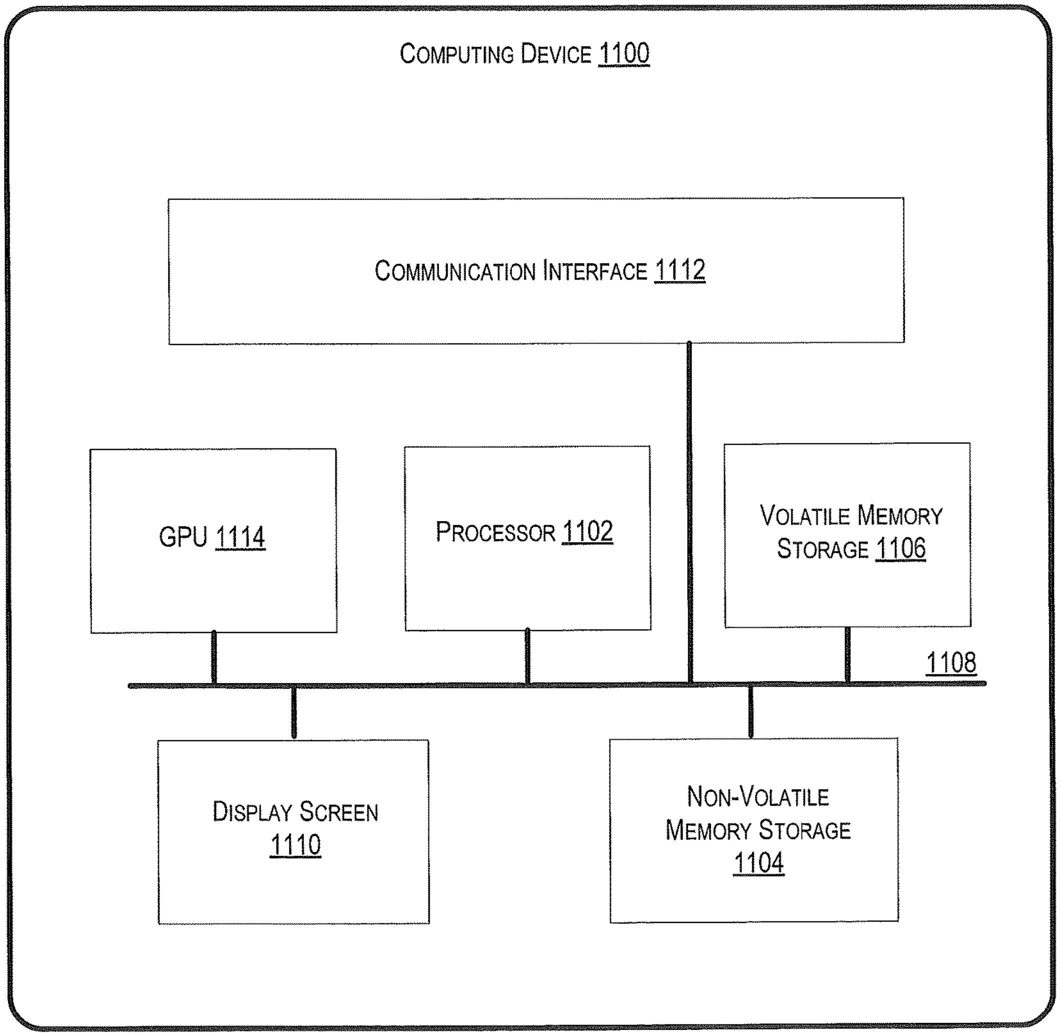
FIG. 11 is a block diagram of a computing device in which embodiments can be implemented.

FIG. 11 is an example computer system 1100 in which embodiments of the present disclosure, or portions thereof, may be implemented as computer-readable code. For example, the components of application program 220, application execution manager 210 or any other components of systems 200, 700-800 and 1000 or methods 300-600 may be implemented in one or more computer devices 1100 using hardware, software implemented with hardware, firmware, tangible computer-readable storage media having instructions stored thereon, or a combination thereof and may be implemented in one or more computer systems or other processing systems. Computer devices 1100 may also be virtualized instances of computers. Components and methods in FIGS. 2-8 and 10 may be embodied in any combination of hardware and software.

Computing device 1100 may include one or more processors 1102, one or more non-volatile storage mediums 1104, one or more memory devices 1106, a communication infrastructure 1108, a display screen 1110 and a communication interface 1112. Computing device 1100 may also have networking or communication controllers, input devices (keyboard, a mouse, touch screen, etc.) and output devices (printer or display).

Processor(s) 1102 are configured to execute computer program code from memory devices 1104 or 1106 to perform at least some of the operations and methods described herein, and may be any conventional or special purpose processor, including, but not limited to, digital signal processor (DSP), field programmable gate array (FPGA), application specific integrated circuit (ASIC), and multi-core processors.

GPU 1114 is a specialized processor that executes instructions and programs, selected for complex graphics and mathematical operations, in parallel.

Non-volatile storage 1104 may include one or more of a hard disk drive, flash memory, and like devices that may store computer program instructions and data on computer-readable media. One or more of non-volatile storage device 1104 may be a removable storage device.

Memory devices 1106 may include one or more volatile memory devices such as but not limited to, random access memory. Communication infrastructure 1108 may include one or more device interconnection buses such as Ethernet, Peripheral Component Interconnect (PCI), and the like.

Typically, computer instructions are executed using one or more processors 1102 and can be stored in non-volatile storage medium 1104 or memory devices 1106.

Display screen 1110 allows results of the computer operations to be displayed to a user or an application developer.

Communication interface 1112 allows software and data to be transferred between computer system 1100 and external devices. Communication interface 1112 may include a modem, a network interface (such as an Ethernet card), a communications port, a PCMCIA slot and card, or the like. Software and data transferred via communication interface 1112 may be in the form of signals, which may be electronic, electromagnetic, optical, or other signals capable of being received by communication interface 1112. These signals may be provided to communication interface 1112 via a communications path. The communications path carries signals and may be implemented using wire or cable, fiber optics, a phone line, a cellular phone link, an RF link or other communications channels. According to an embodiment, a host operating system functionally interconnects any computing device or hardware platform with users and is responsible for the management and coordination of activities and the sharing of the computer resources.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, JavaScript, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Aspects of the present disclosure are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

The breadth and scope of the present invention should not be limited by any of the above-described exemplary embodiments or any actual software code with the specialized control of hardware to implement such embodiments, but should be defined only in accordance with the following claims and their equivalents.

What is claimed is:

1. A computer-implemented method, comprising:

obtaining, using a computing device, an application term of a declarative programming language to build an application to be executed on a node in a node network,
  wherein the application term defines the application independent of an application configuration for the application prior to compilation of the application term, and
  wherein the application configuration comprises a plurality of resources required for execution of the application;

obtaining a resource term of the declarative programming language to allocate a resource of the plurality of resources required for execution of the application,
  wherein the resource term defines a software stack independent of the application configuration prior to compilation of the resource term, and
  wherein the software stack provides functionality required by the application;

obtaining an action term of the declarative programming language for performing an action of the application,
  wherein the action term defines the action independent of the application configuration prior to compilation of the action term,
  wherein the action term performs lifecycle events of the application;

obtaining a task term of the declarative programming language for performing a task of the action,
  wherein the task term defines the task of the action independent of the application configuration prior to compilation of the task term;

compiling the application term, the resource term, the action term, and, the task term to generate lower level code for execution;

executing the compiled application term, the compiled resource term, the compiled action term and the compiled task term;

selecting, by an application execution manager, the node in the node network to execute the application;

preparing, by the application execution manager, the resource for the application on the selected node at the execution time of the compiled resource term, wherein preparing the resource for the application comprises allocating the resource on the selected node of the node network, responsive to execution of the compiled resource term;

executing an action corresponding to the resource on the selected node responsive to the execution of the compiled action term;

responsive to the execution of the compiled application term, modifying an application configuration file for the application on the selected node, wherein the modifying of the application configuration file comprises generating a unique application variable for the application at the execution time of the compiled application term, wherein the unique application variable introduces application specific values into the application configuration of the application on the selected node at the execution time of the compiled application term; and executing, by the application execution manager, the application using the allocated resource and the modified application configuration file.

2. The method of claim 1, wherein the application term, the resource term, the action term and the task term are compilable as syntax keywords of the declarative programming language.

3. The method of claim 1, further comprising:

associating the application configuration with the application at the execution time of the compiled application term based on the selected node.

4. The method of claim 1, further comprising:

generating a second unique application variable for a second application configuration of a second application on the selected node of a same type as the application, wherein the unique application variable is a first unique application variable, and wherein the application and the second application are executed on the selected node simultaneously.

5. The method of claim 1, wherein the action term performs lifecycle events of the application selected from the group consisting of installation of the application, backup of the application and restoration of the application.

6. The method of claim 1, wherein modifying the application configuration file for the application on the selected node comprises:

opening the application configuration file on the selected node;

searching within the application configuration file for a string related to the resource that was allocated;

replacing a value associated with the string related to the resource that was allocated with an updated value corresponding to the resource that was allocated; and saving the application configuration file on the selected node.

7. The method of claim 6, wherein the string related to the resource that was allocated is a database connection string; and wherein the updated value corresponding to the resource that was allocated is a database port.

8. The method of claim 1 wherein the application term of the declarative programming language creates an application object to maintain application specific configuration data, and wherein the application specific configuration data is developed in the application object at execution time of the compiled application term.

9. A system, comprising:

a processor; and a memory coupled to the processor and comprising computer readable program code embodied in the memory that when executed by the processor causes the processor to perform operations comprising:

obtaining, using a computing device, an application term of a declarative programming language to build an application to be executed on a node in a node network, wherein the application term defines the application independent of an application configuration for the application prior to compilation of the application term, and wherein the application configuration comprises a plurality of resources required for execution of the application;

obtaining a resource term of the declarative programming language to allocate a resource of the plurality of resources required for execution of the application, wherein the resource term defines a software stack independent of the application configuration prior to compilation of the resource term, and wherein the software stack provides functionality required by the application;

obtaining an action term of the declarative programming language for performing an action of the application, wherein the action term defines the action independent of the application configuration prior to compilation of the action term, wherein the action term performs lifecycle events of the application; and obtaining a task term of the declarative programming language for performing a task of the action, wherein the task term defines the task of the action independent of the application configuration prior to compilation of the task term;

compiling the application term, the resource term, the action term, and; the task term to generate lower level code for execution;

executing the compiled application term, the compiled resource term, the compiled action term and the compiled task term;

selecting, by an application execution manager, the node in the node network to execute the application;

preparing, by the application execution manager, the resource for the application on the selected node at the execution time of the compiled resource term, wherein preparing the resource for the application comprises allocating the resource on the selected node of the node network, responsive to execution of the compiled resource term;

executing an action corresponding to the resource on the selected node responsive to the execution of the compiled action term;

responsive to the execution of the compiled application term, modifying an application configuration file for the application on the selected node, wherein the modifying of the application configuration file comprises generating a unique application variable for the application at the execution time of the compiled application term, wherein the unique application variable introduces application specific values into the application configuration of the application on the selected node at the execution time of the compiled application term; and executing, by the application execution manager, the application using the allocated resource and the modified application configuration file.

10. The system of claim 9, the operations further comprising:

associating the application configuration with the application at the execution time of the compiled application term based or the selected node.

11. The system of claim 9, wherein the action term performs lifecycle events of the application selected from the group consisting of installation of the application, backup of the application and restoration of the application.

12. The system of claim 9, wherein modifying the application configuration file for the application on the selected node comprises:

opening the application configuration file on the selected node;

searching within the application configuration file for a string related to the resource that was allocated;

replacing a value associated with the string related to the resource that was allocated with an updated value corresponding to the resource that was allocated; and saving the application configuration file on the selected node.

13. The system of claim 12, wherein the string related to the resource that, was allocated is a database connection string; and wherein the updated value corresponding to the resource that was allocated is a database port.

14. The system of claim 9, further comprising:

generating a second unique application variable for a second application configuration of a second application on the selected node of a same type as the application, wherein the unique application variable is a first unique application variable, and wherein the application, and the second application are executed on the selected node simultaneously.

15. A computer program product, comprising:

a non-transitory computer readable storage medium having computer readable program code embodied in the medium, that when executed by a processor causes the processor to perform operations comprising:

obtaining, using a computing device, an application term of a declarative programming language to build an application to be executed on a node in a node network, wherein the application term defines the application independent of an application configuration for the application prior to compilation of the application term, and wherein the application configuration comprises a plurality of resources required for execution of the application;

obtaining a resource term of the declarative programming language to allocate a resource of the plurality of resources required for execution of the application, wherein the resource term defines a software stack independent of the application configuration prior to compilation of the resource term, and wherein the software stack provides functionality required by the application;

obtaining an action term of the declarative programming language for performing an action of the application, wherein the action term defines the action independent of the application configuration prior to compilation of the action term, wherein the action term performs lifecycle events of the application; and obtaining a task term of the declarative programming language for performing a task of the action, wherein the task term defines the task of the action independent of the application configuration prior to compilation of the task term;

compiling the application term, the resource term, the action term, and the task term to generate lower level code for execution;

executing the compiled application term, the compiled resource term, the compiled action term and the compiled task term;

selecting, by an application execution manager, the node in the node network to execute the application;

preparing, by the application execution manager, the resource for the application on the selected node by at the execution time of the compiled resource term, wherein preparing the resource for the application comprises allocating the resource on the selected node of the node network, responsive to execution of the compiled resource term;

executing an action corresponding to the resource on the selected node responsive to the execution of the compiled action term;

responsive to the execution of the compiled application term, modifying an application configuration file for the application on the selected node, wherein the modifying of the application configuration file comprises generating a unique application variable for the application at the execution time of the compiled application term, wherein the unique application variable introduces application specific values into the application configuration of the application on the selected node at the execution time of the compiled application term; and executing, by the application execution manager, the application using the allocated resource and the modified application configuration file.

16. The computer program product of claim 15, wherein modifying the application configuration file for the application on the selected node comprises:

opening the application configuration file on the selected node;

searching within the application configuration file for a string related to the resource that, was allocated;

replacing a value associated with the string related to the resource that was allocated with an updated value corresponding to the resource that was allocated: and saving the application configuration file on the selected node.

17. The computer program product of claim 16, wherein the string related to the resource that was allocated is a database connection string; and wherein the updated value corresponding to the resource that was allocated is a database port.

18. The computer program product of claim 15, further comprising:

generating a second unique application variable for a second application configuration of a second application on the selected node of a same type as the application, wherein the unique application variable is a first unique application variable, and wherein the application and the second application are executed on the selected node simultaneously.

19. The computer program product of claim 15, wherein the action term performs lifecycle events of the application selected from the group consisting of installation of the application, backup of the application, and restoration of the application.

* * * * *